No. 879,274. PATENTED FEB. 18, 1908.
C. KRÄMER.
FRICTION COUPLING OR CLUTCH.
APPLICATION FILED JAN. 25, 1907.
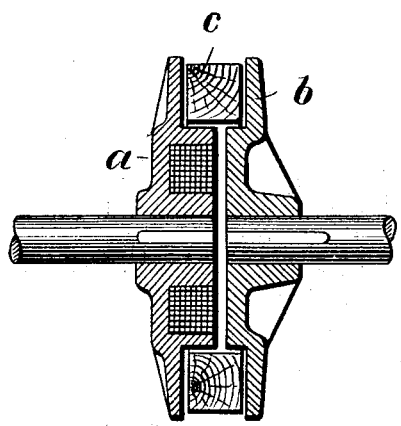

UNITED STATES PATENT OFFICE.

CHRISTIAN KRÄMER, OF FRANKFORT-ON-THE-MAIN, GERMANY, ASSIGNOR TO FELTEN & GUILLEAUME-LAHMEYERWERKE ACTIEN-GESELLSCHAFT, OF FRANKFORT-ON-THE-MAIN, GERMANY.

FRICTION COUPLING OR CLUTCH.

No. 879,274.      Specification of Letters Patent.      Patented Feb. 18, 1908.

Application filed January 25, 1907. Serial No. 354,107.

*To all whom it may concern:*

Be it known that I, CHRISTIAN KRÄMER, a subject of the German Emperor, and a resident of Frankfort-on-the-Main, Germany, have invented certain new and useful Improvements in Friction Couplings or Clutches, of which the following is a specification.

This invention relates to friction couplings, or clutches, and especially to electro-magnetic couplings, or clutches, in which rubbing surfaces of non-magnetic material are arranged between the magnetized surfaces for the purpose of preventing the said magnetized surfaces binding together by residual magnetism, and thereby saving a useless expenditure of power in separating the parts of the clutch.

In order to secure the smallest possible dimensions of the coupling, or clutch, and as high a torque as possible, a loose ring, (or the equivalent), of suitable substance, such for example as wood, is arranged between the driving and driven parts of the coupling, or clutch, the said ring, or the equivalent, moving on the driven and driving parts when the coupling, or clutch, is slipping and imparting to both parts the heat generated by the friction.

The accompanying drawing shows in section an example of an electro magnetic coupling, or clutch, constructed in accordance with this invention, in which an annular electro-magnet $a$, secured to the driving shaft, serves to draw a disk $b$, arranged so as to be capable of sliding on the shaft to be driven against the friction ring $c$ situated between the outer portions of the parts $a$ and $b$. It is not essential that the ring $c$ be made in one piece, for instance, it may be constituted by several blocks connected by a spider, or by a body of trellis work, or other connection.

In the couplings or clutches hitherto known when the coupling is operated, the heat is generated by friction on one annular surface only, but if, in accordance with this invention, a loose intermediate body be used the action of the coupling is much smoother and the heat generated by friction is imparted to more than the one surface and therefore is more easily dissipated.

It has been heretofore proposed to provide one member of a magnetic clutch with a non-metallic section, which section was rigidly connected with the clutch member. As above noted, however, such a construction as is illustrated and described herein possesses advantages over a construction in which the non-metallic body is rigidly connected with one of the clutch members. By mounting the member $c$ loosely with relation to both the clutch members the heat generated by the clutch members rubbing on such section is most readily dissipated than where said non-metallic section is rigid with one of the clutch members.

I claim:

In a friction clutch, the combination with a metal driving surface and a metal driven surface, of a non-metallic body loosely mounted between and adapted to contact with both said driving and driven surfaces, substantially as and for the purpose described.

In testimony whereof I have signed my name to this specification in the presence of two subscribing witnesses.

CHRISTIAN KRÄMER.

Witnesses:
 ERWIN DIPPEL,
 MICHAEL VOLK.